(12) United States Patent
Sato

(10) Patent No.: US 12,734,994 B2
(45) Date of Patent: Sep. 15, 2026

(54) VEHICLE-COMPARTMENT ABNORMALITY DETECTION APPARATUS

(71) Applicant: SUBARU CORPORATION, Tokyo (JP)

(72) Inventor: Masayuki Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 43 days.

(21) Appl. No.: 19/036,531

(22) Filed: Jan. 24, 2025

(65) Prior Publication Data

US 2025/0304011 A1 Oct. 2, 2025

(30) Foreign Application Priority Data

Mar. 27, 2024 (JP) ................................ 2024-052592

(51) Int. Cl.

*B60R 25/31* (2013.01)
*B60R 16/023* (2006.01)
*B60R 25/10* (2013.01)

(52) U.S. Cl.

CPC .......... *B60R 25/31* (2013.01); *B60R 16/0231* (2013.01); *B60R 25/1006* (2013.01)

(58) Field of Classification Search

CPC .. B60R 25/31; B60R 16/0231; B60R 25/1006
See application file for complete search history.

(56) References Cited

U.S. PATENT DOCUMENTS

| | | | | |
|---|---|---|---|---|
| 6,768,420 | B2 * | 7/2004 | McCarthy | B60N 2/0026 340/425.5 |
| 11,318,839 | B2 * | 5/2022 | Kojima | B60K 28/04 |
| 11,967,219 | B2 * | 4/2024 | Liu | G06Q 10/087 |
| 12,280,661 | B2 * | 4/2025 | Homma | B60R 25/31 |
| 2009/0005936 | A1 * | 1/2009 | Browne | B60R 25/1004 297/217.2 |

FOREIGN PATENT DOCUMENTS

| | | |
|---|---|---|
| JP | 2004-291833 A | 10/2004 |
| JP | 2020-004242 A | 1/2020 |

* cited by examiner

*Primary Examiner* — John A Tweel, Jr.
(74) *Attorney, Agent, or Firm* — Rimon P.C.

(57) ABSTRACT

A vehicle-compartment abnormality detection apparatus for a vehicle includes a sensor signal processor, a comparator, a determiner, and an abnormality detector. The sensor signal processor receives a sensor signal from pressure sensors disposed inside a vehicle compartment. The comparator compares a sensor signal level with a predetermined threshold. The determiner starts up when a result of comparison indicates that the sensor signal level is greater than the predetermined threshold in a state where the drive system is stopped, and determines at least whether a key is present inside the vehicle compartment. The abnormality detector starts up when the result of comparison indicates that the sensor signal level is greater than the predetermined threshold in the state where the drive system is stopped, and detects an abnormality occurring inside the vehicle compartment when a result of determination indicates that the key is not present inside the compartment.

7 Claims, 6 Drawing Sheets

VEHICLE-COMPARTMENT ABNORMALITY DETECTION APPARATUS

CROSS-REFERENCE TO RELATED APPLICATIONS

The present application claims priority from Japanese Patent Application No. 2024-052592 filed on Mar. 27, 2024, the entire contents of which are hereby incorporated by reference.

BACKGROUND

The disclosure relates to a vehicle-compartment abnormality detection apparatus.

Recently, illicit behaviors such as car break-ins and vehicle thefts of third parties have become social problems. The third parties use methods, such as picking locks, to enter parked vehicles and steal valuables. Further, leaving young children unattended inside vehicles during high temperatures of summer, which leads to severe conditions, has also gained attention as a social problem.

Japanese Unexamined Patent Application Publication (JP-A) No. 2004-291833, for example, discloses an apparatus usable for preventing such thefts. The apparatus includes a warning controller that controls an acoustic output of a warning sound, and a warning canceler that cancels the acoustic output of the warning sound in response to a predetermined operation. The warning controller includes a first warning control unit that outputs a first warning sound to inside a vehicle compartment when detecting a first timing signal, and a second warning control unit that outputs a second warning sound to outside the vehicle compartment when detecting a second timing signal while the first warning sound is being outputted to inside the vehicle compartment.

JP-A No. 2020-004242, for example, discloses an apparatus usable for dealing with the leaving of a person inside a vehicle. The apparatus includes a leaving detector and a control content determiner. The leaving detector detects the leaving of a person inside a vehicle compartment, based on a sensor signal received from a sensor that detects the presence of a person left inside the vehicle compartment. When the leaving of a person inside the vehicle compartment is detected, the control content determiner determines the content of control to deal with the leaving, based on a position of the vehicle acquired by a vehicle position acquirer.

SUMMARY

An aspect of the disclosure provides a vehicle-compartment abnormality detection apparatus configured to be applied to a vehicle. The vehicle-compartment abnormality detection apparatus includes a sensor signal processor, a comparator, a determiner, and an abnormality detector. The sensor signal processor is configured to receive a sensor signal from a group of pressure sensors disposed inside a vehicle compartment of the vehicle. The comparator is configured to make a comparison of a sensor signal level that is a signal level of the sensor signal received by the sensor signal processor with a predetermined threshold. The determiner is configured to start up when a result of the comparison made by the comparator indicates that the sensor signal level is greater than the predetermined threshold in a state where a drive system of the vehicle is stopped, and make a first determination at least as to whether a key is present inside the vehicle compartment. The abnormality detector is configured to start up when the result of the comparison made by the comparator indicates that the sensor signal level is greater than the predetermined threshold in the state where the drive system of the vehicle is stopped, and detect an abnormality occurring inside the vehicle compartment when a result of the first determination made by the determiner indicates that the key is not present inside the vehicle compartment.

An aspect of the disclosure provides a vehicle-compartment abnormality detection apparatus configured to be applied to a vehicle. The vehicle-compartment abnormality detection apparatus includes a group of pressure sensors, one or more processors, and one or memories. The group of pressure sensors is disposed inside a vehicle compartment of the vehicle. The one or more memories are communicably coupled to the one or more processors. The one or more processors are configured to receive a sensor signal from the group of pressure sensors, make a comparison of a sensor signal level that is a signal level of the sensor signal with a predetermined threshold, start up a drive system of the vehicle when a result of the comparison indicates that the sensor signal level is greater than the predetermined threshold in a state where the drive system of the vehicle is stopped and make a determination at least as to whether a key is present inside the vehicle compartment, and detect an abnormality occurring inside the vehicle compartment when a result of the determination indicates that the key is not present inside the vehicle compartment.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Figure 1:
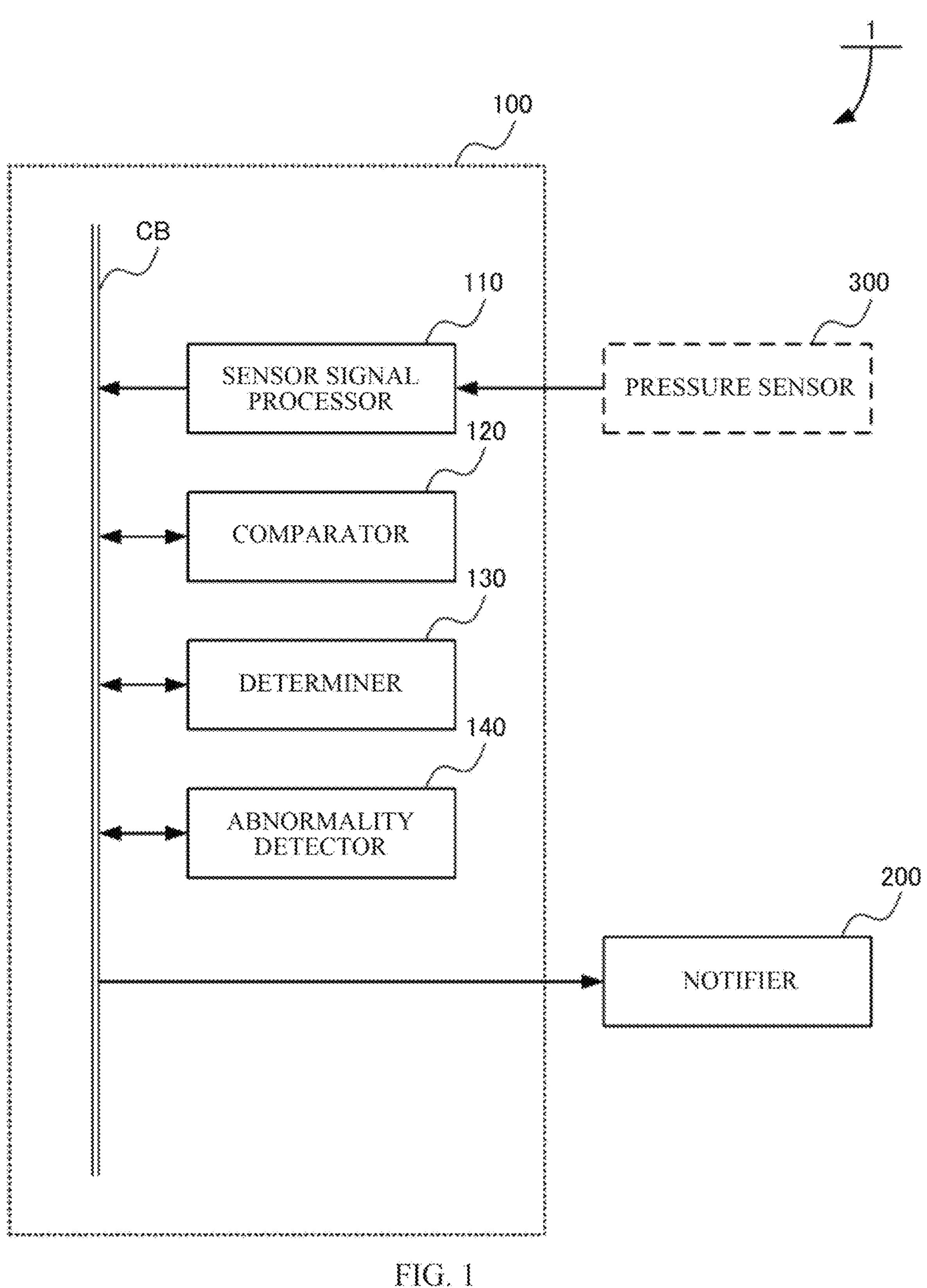
FIG. 1 is a block diagram illustrating a configuration example of a vehicle-compartment abnormality detection apparatus according to one example embodiment of the disclosure.

An apparatus disclosed in JP-A No. 2004-291833 outputs a warning sound to inside and outside a vehicle compartment when a mode switch is operated to cause the apparatus to switch to a monitoring mode. Such a configuration necessitates a large amount of electric power to cause the apparatus to monitor a possible occurrence of car break-in or stealing of the vehicle while the vehicle is parked in an ignition-off state. The practical use of the apparatus is thus not realistic. Further, the apparatus disclosed in JP-A No. 2004-291833 detects unauthorized invasion of a third party to the vehicle compartment, triggered by detection of lighting of a room lamp, an ON-operation of an ignition switch, or a vehicle speed pulse. However, when the ON-operation of the ignition switch or the vehicle speed pulse is detected, the vehicle has been already stolen by the third party. It is therefore difficult for the apparatus to prevent illicit behaviors of the third party. An apparatus disclosed in JP-A No. 2020-004242 determines the content of control to deal with leaving of a person inside a vehicle compartment, based on a vehicle position detected upon the detection of leaving. Such a configuration necessitates a large amount of electric power to cause the apparatus to monitor a possible occurrence of leaving while the vehicle is parked in an ignition-off state. The practical use of the apparatus is thus not realistic. Further, the apparatus disclosed in JP-A No. 2020-004242 is configured to start operating upon the detection of leaving of a person inside the vehicle compartment. It is therefore difficult for the apparatus to predict and prevent the leaving.

It is desirable to provide a vehicle-compartment abnormality detection apparatus that makes it possible to detect an abnormality occurring inside a compartment of a vehicle before the vehicle comes into an abnormal state, while saving electric consumption.

In the following, some example embodiments of the disclosure are described in detail with reference to FIGS. 1 to 6. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In addition, elements that are not directly related to any embodiment of the disclosure are unillustrated in the drawings.

First Example Embodiment

A vehicle-compartment abnormality detection apparatus 1 according to a first example embodiment of the disclosure will now be described with reference to FIGS. 1 to 3. The vehicle-compartment abnormality detection apparatus 1 may be applied to a vehicle.

<Configuration Example of Vehicle-Compartment Abnormality Detection Apparatus 1>

Referring to FIG. 1, the vehicle-compartment abnormality detection apparatus 1 according to the first example embodiment may include a controller 100 and a notifier 200.

The controller 100 may control an overall operation of the vehicle-compartment abnormality detection apparatus 1, in accordance with a control program stored in a non-illustrated read only memory (ROM), for example.

In the present example embodiment, the controller 100 may be configured to control a process of a sensor signal processor 110, a comparison process of a comparator 120, a determination process of a determiner 130, and an abnormality detection process of an abnormality detector 140. When acquiring a result of detection indicating that an abnormality has been detected inside a vehicle compartment, the notifier 200 may issue a notification about the abnormality to inside and outside the vehicle compartment.

The notification may be an auditory notification such as a sound or a visual notification such as illumination lighting.

Referring to FIG. 1, the controller 100 includes the sensor signal processor 110, the comparator 120, the determiner 130, and the abnormality detector 140.

The sensor signal processor 110 receives sensor signals from a group of pressure sensors that are planarly arranged in a lower region of a surface of a seat in the vehicle and a group of pressure sensors that are planarly arranged in an upper region or a lower region of a floor carpet disposed near the feet of an occupant in the vehicle.

Figure 2:
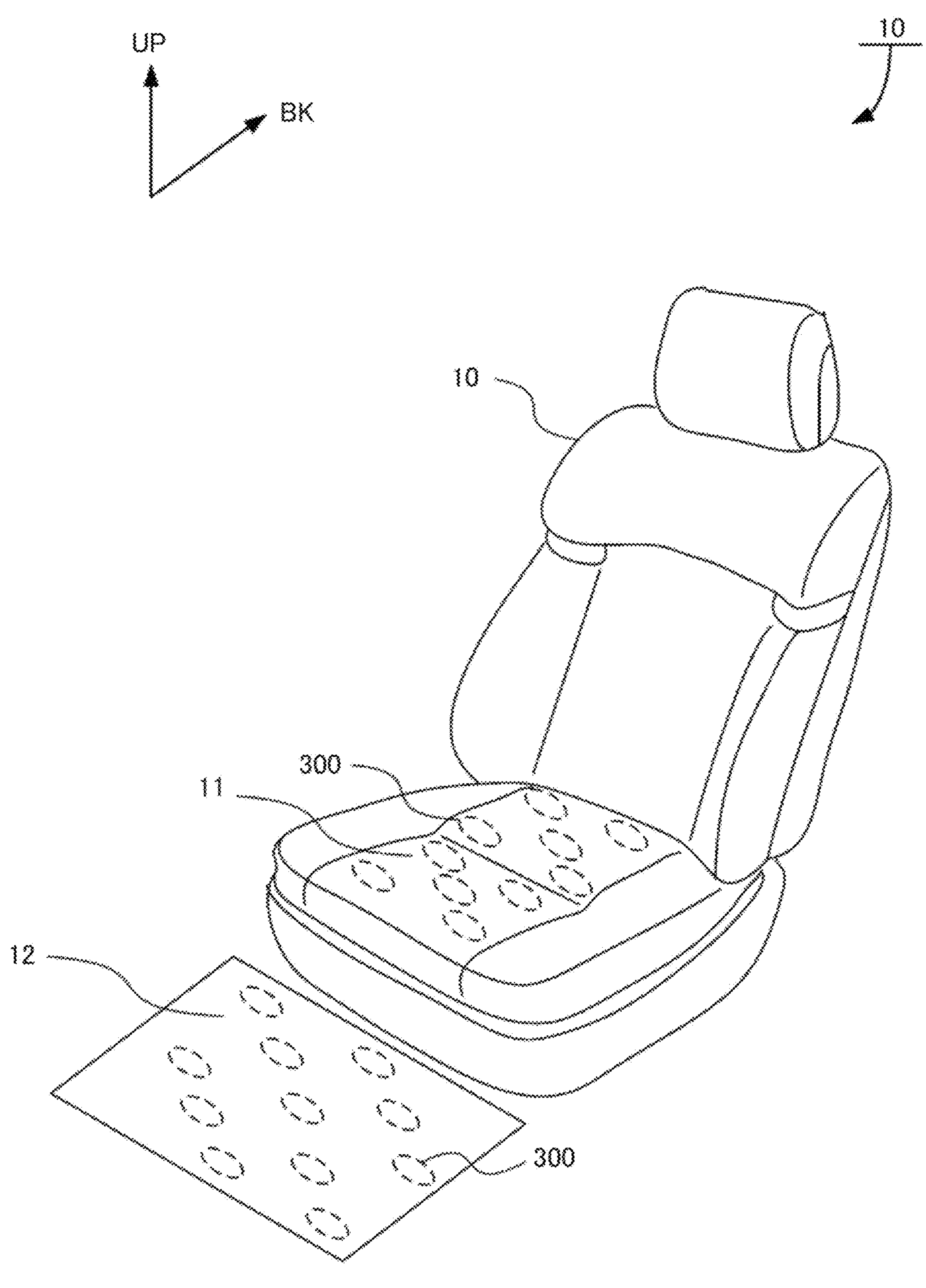
FIG. 2 is a diagram illustrating arrangement positions of pressure sensors of the vehicle-compartment abnormality detection apparatus illustrated in FIG. 1.

In an example illustrated in FIG. 2, pressure sensors 300 may be planarly arranged in a lower region of a seat surface 11 of a passenger's seat 10, and in an upper region or a lower region of a floor carpet 12 disposed near the feet of a passenger seated in the passenger's seat 10 in the vehicle compartment.

The sensor signal processor 110 may receive sensor signals from the groups of pressure sensors 300 as input data.

Although the pressure sensors 300 disposed on the passenger's seat 10 are exemplified in FIG. 2, the pressure sensors 300 may be disposed on a driver's seat, a rear seat, or a floor carpet 12 disposed near the feet of a driver seated in the driver's seat or near the feet of a passenger seated in the rear seat.

The pressure sensors 300 may correspond to respective ports of the sensor signal processor 110. That is, the sensor signal processor 110 may be configured to determine which pressure sensor 300 has reacted by determining the port having received the sensor signal.

The sensor signal processor 110 may transmit the sensor signal received from the group of pressure sensors 300 as data associated with the respective pressure sensors 300 to the comparator 120, which will be described later, via a bus line CB through controller area network (CAN) communication.

The comparator 120 compares a level of the received sensor signal (hereinafter also referred to as "sensor signal level") with a predetermined threshold.

The predetermined threshold may be usable for excluding the weight of a child safety seat or a junior safety seat that is disposed on the seat in the vehicle.

In some embodiments, the predetermined threshold may be set by the occupant of the vehicle, to 5 kg, 10 kg, or 15 kg, based on the weight of the child safety seat or the junior safety seat itself.

The comparator 120 may send a result of comparison to the determiner 130 and the abnormality detector 140, which will be described later, via the bus line CB through the CAN communication.

The determiner 130 starts up when the result of comparison indicates that the sensor signal level is greater than the predetermined threshold in a state where a drive system of the vehicle is stopped.

After starting up, the determiner 130 determines at least whether a key is present inside the vehicle compartment.

In some embodiments, the determiner 130 may be started up by a wake-up functionality of the CAN communication, triggered by detection of the sensor signal level greater than the predetermined threshold.

Further, the determiner 130 may determine whether a key is present inside the vehicle compartment, based on data received from an electronic control unit (ECU), for example.

In some embodiments, the determiner 130 may acquire image data on a captured image of the inside of the vehicle compartment from an imaging apparatus, and determine whether a key is present inside the vehicle compartment, based on the acquired image data. In some embodiments, the determiner 130 may have a near field communication functionality that establishes communication with a smart key, and may determine whether the smart key is present inside the vehicle compartment through the communication.

The determiner 130 may send a result of determination to the abnormality detector 140, which will be described later, via the bus line CB through the CAN communication.

The abnormality detector 140 starts up when the result of comparison indicates that the sensor signal level is greater than the predetermined threshold in the state where the drive system of the vehicle is stopped. After starting up, the abnormality detector 140 may detect an abnormality occurring inside the vehicle compartment when the result of comparison indicates that no key has been detected inside the vehicle compartment.

In some embodiments, the abnormality detector 140 may be started up by the wake-up functionality of the CAN communication, triggered by the detection of the sensor signal level greater than the predetermined threshold. Thereafter, when it is determined that the level of the sensor signal received from the pressure sensors 300 is greater than the predetermined threshold and that no key is present inside the vehicle compartment, the abnormality detector 140 may detect an abnormality occurring inside the vehicle compartment.

The abnormality detector 140 may send a result of detection to the notifier 200, which will be described later, via the bus line CB through the CAN communication.

<Processing by Vehicle-Compartment Abnormality Detection Apparatus 1>

Exemplary processing to be performed by the vehicle-compartment abnormality detection apparatus 1 according to the first example embodiment of the disclosure will now be described with reference to FIG. 3.

Figure 3:
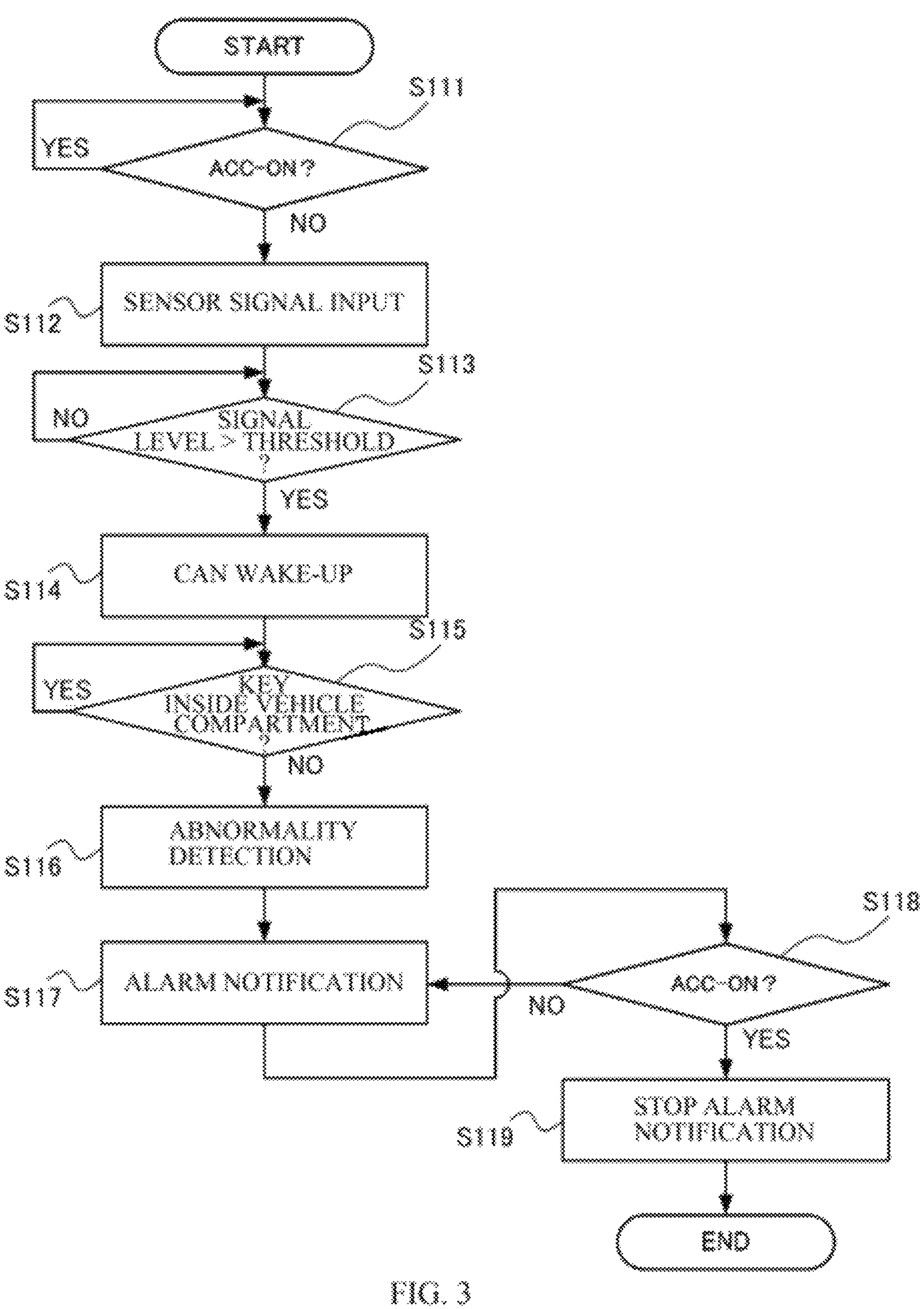
FIG. 3 is a flowchart of processing to be performed by the vehicle-compartment abnormality detection apparatus illustrated in FIG. 1.

Referring to FIG. 3, the controller 100 may determine, in Step S111, whether an accessory (ACC) power supply is an ON-state, based on data received from an ECU.

If determining that the ACC power supply is in the ON-state (Step S111: YES), the controller 100 may shift to a stand-by mode.

If determining that the ACC power supply is in the OFF-state (Step S111: NO), the controller 100 may make the sensor signal transmitted from the pressure sensor 300 to the sensor signal processor 110 effective, in Step S112.

The comparator 120 may receive the sensor signal via the bus line CB through the CAN communication, compare the sensor signal level with the predetermined threshold, and determine whether the sensor signal level is greater than the predetermined threshold, in Step S113.

If determining that the sensor signal level is not greater than the predetermined threshold (Step S113: NO), the comparator 120 may shift to a stand-by mode.

If determining that the sensor signal level is greater than the predetermined threshold (Step S113: YES), the comparator 120 may output a signal including the result of comparison indicating that the sensor signal level is greater than the predetermined threshold to the determiner 130 and the abnormality detector 140, via the bus line CB through the CAN communication.

The determiner 130 and the abnormality detector 140 may be thereby started up (woken up) in Step S114.

When receiving the signal including the result of comparison indicating that the sensor signal level is greater than the predetermined threshold, the determiner 130 may determine, in Step S115, whether a key is present inside the vehicle compartment.

If determining that the key is present inside the vehicle compartment (Step S115: YES), the determiner 130 may shift to a stand-by mode.

If determining that no key is present inside the vehicle compartment (Step S115: NO), the determiner 130 may output a signal including the result of determination indicating that no key is present inside the vehicle compartment to the abnormality detector 140, via the bus line CB through the CAN communication.

When receiving the signal including the result of determination indicating that no key is present inside the vehicle compartment, the abnormality detector 140 may detect an abnormality occurring inside the vehicle compartment (Step S116).

The abnormality detector 140 may output a signal including the result of detection indicating that the abnormality has been detected to the notifier 200, via the bus line CB through the CAN communication.

When receiving the signal including the result of detection indicating that the abnormality has been detected, the notifier 200 may execute an alarm notification in Step S117.

Thereafter, the controller 100 may determine, in Step S118, whether the ACC power supply is in the ON-state, based on the data received from the ECU.

If determining that the ACC power supply is in an OFF-state (Step S118: NO), the controller 100 may cause the notifier 200 to continue to execute the alarm notification.

If determining that the ACC power supply is in the ON-state (Step S118: YES), the controller 100 may cause the notifier 200 to stop executing the alarm notification in Step S119, following which the processing may end.

<Workings and Effects>

As described above, the sensor signal processor 110 of the vehicle-compartment abnormality detection apparatus 1 according to the present example embodiment receives the sensor signals from the groups of the pressure sensors 300 planarly arranged.

In some embodiments, the groups of the pressure sensors 300 may be planarly arranged in the lower region of the seat surface of the passenger's seat 10 in the vehicle, and in the upper region or the lower region of the floor carpet 12 disposed near the feet of the passenger in the vehicle.

This makes it possible to accurately detect the presence of a load on the seat surface 11 of the passenger's seat 10 of the vehicle.

In some embodiments where the pressure sensors 300 are arranged on the floor carpet 12 disposed near the feet of the passenger in the vehicle, it is possible to determine whether the passenger is seated in the seat surface 11 of the passenger's seat 10 except when the passenger takes a particular posture such as kneeling on the passenger's seat 10 or holding his/her knees to his/her chest on the passenger's seat 10.

Further, the pressure sensors 300 may correspond to the respective ports of the sensor signal processor 110. Such a configuration makes it possible to accurately determine which pressure sensor 300 a pressure is applied to, by analyzing the presence or absence of the sensor signal.

Further, the determiner 130 and abnormality detector 140 of the vehicle-compartment abnormality detection apparatus 1 according to the present example embodiment may be started up by the wake-up functionality of the CAN communication, triggered by the signal received from the comparator 120 and indicating that the sensor signal level is greater than the predetermined threshold.

This makes it possible to detect an abnormality occurring inside the vehicle compartment before the vehicle comes into an abnormal state, while saving electric power consumption.

Further, the comparator 120 of the vehicle-compartment abnormality detection apparatus 1 according to the present example embodiment compares the sensor signal level received from the sensor signal processor 110 with the predetermined threshold.

The predetermined threshold is usable for excluding the weight of a child safety seat or a junior safety seat disposed on the seat in the vehicle.

This makes it possible to accurately determine the presence of a child on the child safety seat or the junior safety seat.

This also makes it possible to accurately determine whether a load disposed on the passenger's seat 10 is an occupant, regardless of the presence of the child safety seat or the junior safety seat.

Further, the abnormality detector 140 of the vehicle-compartment abnormality detection apparatus 1 according to the present example embodiment detects the abnormality occurring inside the vehicle compartment when the determiner 130 determines that no key is present inside the vehicle compartment.

That is, when no key is present inside the vehicle compartment, it is determined that a person is left inside the vehicle whose doors are locked.

When the person is an occupant, it may be determined that the leaving of the person inside the vehicle compartment has occurred at high possibility. When the person is a third party other than the occupant, it may be determined that car break-in has occurred at high possibility. This makes it possible to properly detect these abnormalities.

The comparator 120, the determiner 130, and the abnormality detector 140 of the vehicle-compartment abnormality detection apparatus 1 according to the present example embodiment may be coupled to each other through the CAN communication.

Accordingly, nodes of the CAN protocol that are in a sleep state may be woken up by the wake-up functionality when a dominant bus signal is transmitted to a bus. That is, the determiner 130 and the abnormality detector 140 that are in a sleep state may be woken up when the comparator 120 transmits a dominant bus signal indicating that the sensor signal level is greater than the predetermined threshold to the bus.

This makes it possible to save the electric power consumption at the time when the ACC power supply is in the OFF-state.

Further, when an abnormality is detected, the notifier 200 of the vehicle-compartment abnormality detection apparatus 1 according to the present example embodiment may issue a notification about the abnormality to inside and outside the vehicle compartment.

Such a notification about the abnormality makes it possible to immediately get rid of the abnormality.

Second Example Embodiment

A vehicle-compartment abnormality detection apparatus 1A according to a second example embodiment will now be described with reference to FIGS. 4 to 6.

<Configuration Example of Vehicle-Compartment Abnormality Detection Apparatus 1A>

Figure 4:
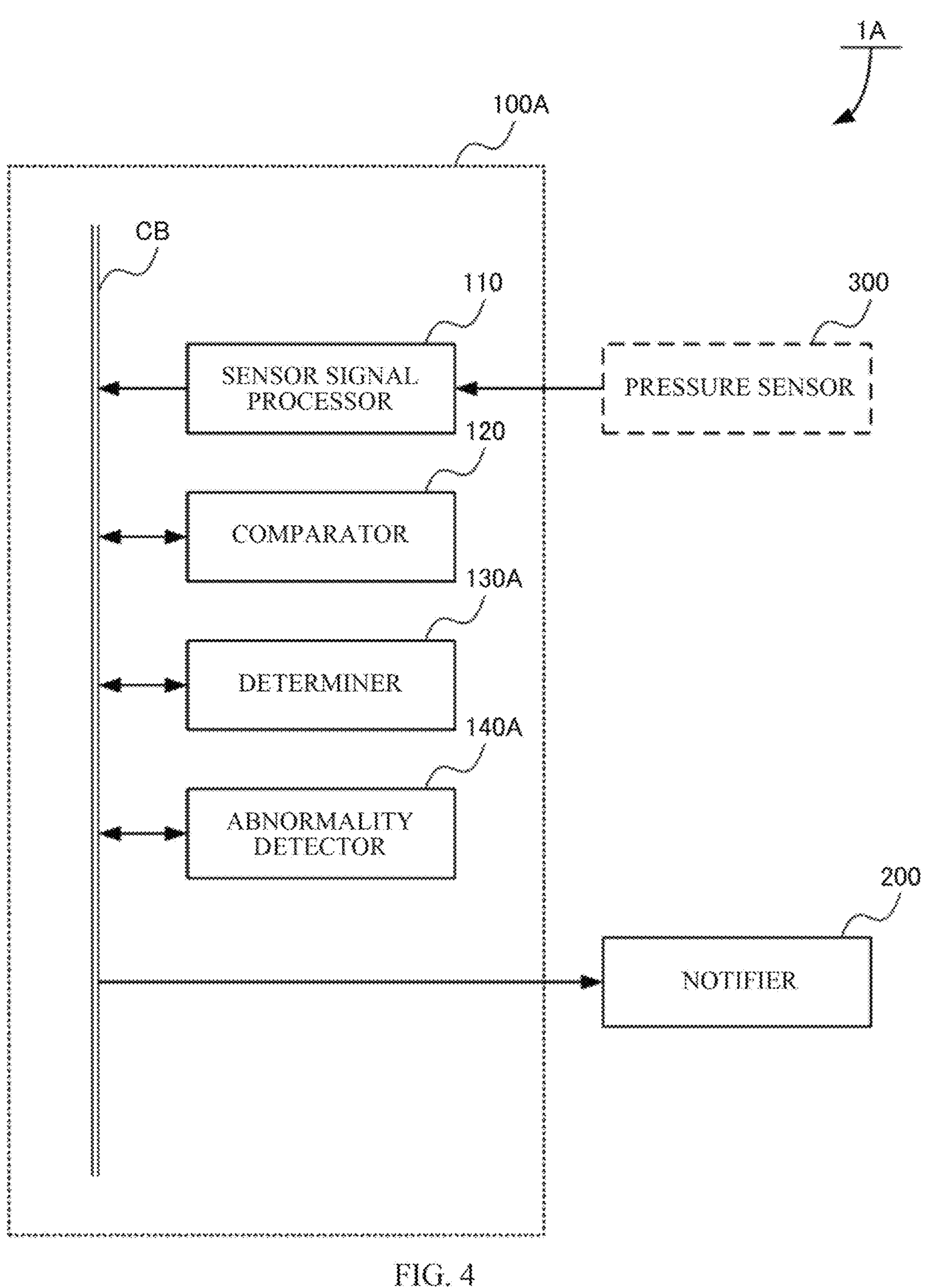
FIG. 4 is a block diagram illustrating a configuration example of a vehicle-compartment abnormality detection apparatus according to one example embodiment of the disclosure.

Referring to FIG. 4, the vehicle-compartment abnormality detection apparatus 1A according to the second example embodiment may include a controller 100A and the notifier 200. The controller 100A may include the sensor signal processor 110, the comparator 120, a determiner 130A, and an abnormality detector 140A.

The determiner 130A may determine whether a door of the vehicle is locked, in addition to whether a key is present inside the vehicle compartment.

In some embodiments, the determiner 130A may determine whether a key is present inside the vehicle compartment, based on the data received from the ECU via the controller 100A.

Further, the determiner 130A may determine whether the door key of the vehicle is locked, based on data received from an ECU via the controller 100A.

Further, the determiner 130A may determine whether the door of the vehicle is locked, based on data received from an ECU via the controller 100A.

The determiner 130A may send a result of determination to the abnormality detector 140A, which will be described later, via the bus line CB through the CAN communication.

When the result of determination made by the determiner 130A indicates that the door of the vehicle is locked and that no key is present inside the vehicle compartment, the abnormality detector 140A may detect an occurrence of leaving of a passenger inside the vehicle compartment.

When the result of determination made by the determiner 130A indicates that the door of the vehicle is unlocked and that no key is present inside the vehicle compartment, the abnormality detector 140A may detect an occurrence of a break-in of a third party in the vehicle compartment.

The result of determination made by the abnormality detector 140A may be sent to the notifier 200 via the bus line CB through the CAN communication.

<Processing by Vehicle-Compartment Abnormality Detection Apparatus 1A>

Exemplary processing to be performed by the vehicle-compartment abnormality detection apparatus 1A according to the second example embodiment of the disclosure will now be described with reference to FIGS. 5 and 6.

Figure 5:
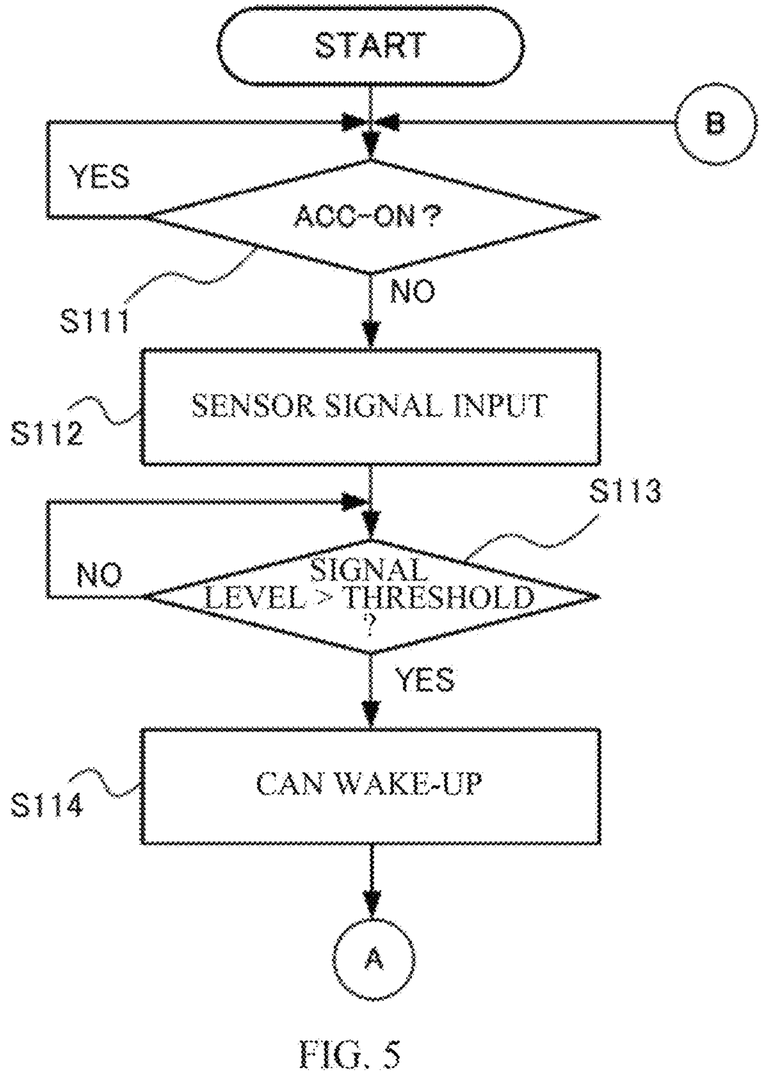
FIG. 5 is a flowchart of processing to be performed by the vehicle-compartment abnormality detection apparatus illustrated in FIG. 4.

Referring to FIG. 5, the controller 100A may determine, in Step S111, whether the ACC power supply is in the ON-state, based on the data received from the ECU.

If determining that the ACC power supply is in the ON-state (Step S111: YES), the controller 100A may shift to the stand-by mode.

If determining that the ACC power supply is in the OFF-state (Step S111: NO), the controller 100A may make the sensor signal transmitted from the pressure sensor 300 to the sensor signal processor 110 effective, in Step S112.

The comparator 120 may receive the sensor signal from the sensor signal processor 110 via the bus line CB through the CAN communication, compare the sensor signal level with the predetermined threshold, and determine whether the sensor signal level is greater than the predetermined threshold, in Step S113.

If determining that the sensor signal level is not greater than the predetermined threshold (Step S113: NO), the comparator 120 may shift to a stand-by mode.

If determining that the sensor signal level is greater than the predetermined threshold (Step S113: YES), the comparator 120 may output the signal including the result of comparison indicating that the sensor signal level is greater than the predetermined threshold to the determiner 130 and the abnormality detector 140, via the bus line CB through the CAN communication.

The determiner 130A and the abnormality detector 140A may be thereby started up (woken up) in Step S114.

Figure 6:
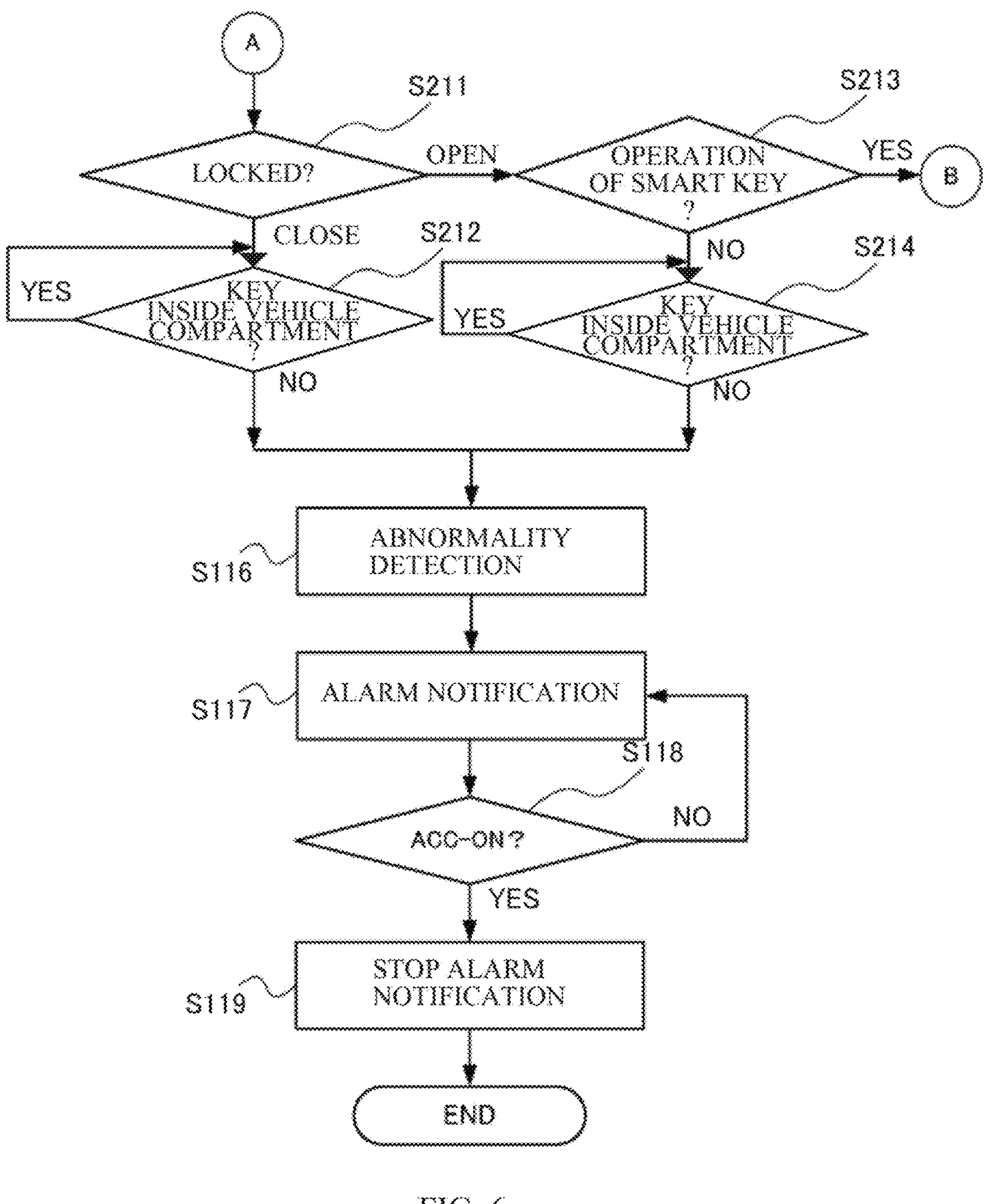
FIG. 6 is a flowchart, subsequent to the flowchart illustrated in FIG. 5, of the processing to be performed by the vehicle-compartment abnormality detection apparatus illustrated in FIG. 4.

Referring to FIG. 6, the determiner 130A may determine, in Step S211, whether the door of the vehicle is locked.

If determining that the door of the vehicle is locked (Step S211: CLOSE), the determiner 130A may determine, in Step S212, whether a key is present inside the vehicle compartment.

If determining, in Step S212, that the key is present inside the vehicle compartment (Step 212: YES), the determiner 130A may shift to a stand-by mode.

If determining, in Step S212, that no key is present inside the vehicle compartment (Step S212: NO), the determiner 130A may output a signal indicating that no key is present inside the vehicle compartment to the abnormality detector 140A, via the bus line CB through the CAN communication.

At this time, the abnormality detector 140A may detect, in Step S116, the occurrence of leaving of the passenger inside the vehicle compartment.

Thereafter, the abnormality detector 140A may output the data indicating that the abnormality has been detected (hereinafter referred to as "abnormality detection data") to the notifier 200, via the bus line CB through the CAN communication.

When receiving the abnormality detection data from the abnormality detector 140A via the bus line CB through the CAN communication, the notifier 200 may execute the alarm notification in Step S117.

Thereafter, the controller 100A may determine, in Step S118, whether the ACC power supply is in the ON-state, based on the data received from the ECU.

If determining that the ACC power supply is in the OFF-state (Step S118: NO), the controller 100A may cause the notifier 200 to continue to execute the alarm notification.

If determining that the ACC power supply is in the ON-state (Step S118: YES), the controller 100A may cause the notifier 200 to stop executing the alarm notification in Step S119, following which the processing may end.

If determining, in Step S211, that the door of the vehicle is unlocked (Step S211: OPEN), the determiner 130A may determine, in Step S213, whether an operation of a smart key has been made, based on data received from an ECU via the controller 100.

If determining that the operation of the smart key has been made (Step S213: YES), the determiner 130A may return the processing to Step S111.

If determining that no operation of the smart key has been made (Step S213: NO), the determiner 130A may determine, in Step S214, whether a key is present inside the vehicle compartment.

If determining that the key is present inside the vehicle compartment (Step S214: YES), the determiner 130A may shift to the stand-by mode.

If determining that no key is present inside the vehicle compartment (Step S214: NO), the determiner 130A may send a signal indicating that no key is present inside the vehicle compartment to the abnormality detector 140A.

At this time, the abnormality detector 140A may detect, in Step S116, the occurrence of break-in of a third party in the vehicle compartment.

Thereafter, the abnormality detector 140A may output the abnormality detection data to the notifier 200, via the bus line CB through the CAN communication.

When receiving the abnormality detection data from the abnormality detector 140A, the notifier 200 may execute the alarm notification in Step S117.

Thereafter, the controller 100A may determine, in Step S118, whether the ACC power supply is in the ON-state, based on the data received from the ECU. If determining that the ACC power supply is in the OFF-state (Step S118: NO), the controller 100A may cause the notifier 200 to continue to execute the alarm notification.

If determining that the ACC power supply is in the ON-state (Step S118: YES), the controller 100A may cause the notifier 200 to stop executing the alarm notification in Step S119, following which the processing may end.

<Workings and Effects>

As described above, the abnormality detector 140A of the vehicle-compartment abnormality detection apparatus 1A according to the present example embodiment may detect the leaving of a passenger inside the vehicle compartment when the result of detection executed by the determiner 130A indicates that the door of the vehicle is locked and that no key is present inside the vehicle compartment.

That is, when it is determined that the door of the vehicle is locked, that no key is present inside the vehicle compartment, and that a passenger is present inside the vehicle compartment, it may be assumed that an occupant or a driver of the vehicle has locked the door of the vehicle and moved away from the vehicle even though a passenger is left inside the vehicle compartment.

Accordingly, when it is determined that the door of the vehicle is locked, that no key is present inside the vehicle compartment, and that a passenger is present inside the vehicle compartment, the vehicle-compartment abnormality detection apparatus 1A makes it possible to immediately notify the occurrence of leaving of the passenger inside the vehicle compartment.

It is therefore possible to immediately detect an abnormality occurring inside the vehicle compartment before the vehicle comes into an abnormal state while saving electric power consumption.

Further, the abnormality detector 140A of the vehicle-compartment abnormality detection apparatus 1A according to the present example embodiment may detect a break-in of a third party in the vehicle compartment when the result of detection executed by the determiner 130A indicates that the door of the vehicle is unlocked and that no key is present inside the vehicle compartment.

That is, when it is determined that the door of the vehicle is unlocked, that no key is present inside the vehicle compartment, and that a person is present inside the vehicle compartment, it is assumed that the door has been unlocked in an unauthorized way such as picking locks, and that a break-in of a third part in the vehicle compartment has occurred.

Accordingly, when it is determined that the door of the vehicle is unlocked, that no key is present inside the vehicle compartment, and that a person is present inside the vehicle compartment, the vehicle-compartment abnormality detection apparatus 1A makes it possible to immediately notify the occurrence of a break-in of a third party in the vehicle compartment.

It is therefore possible to immediately detect an abnormality occurring inside the vehicle compartment before the vehicle comes into an abnormal state while saving electric power consumption.

Modification Example 1

In the first and second example embodiments, the vehicle-compartment abnormality detection apparatuses 1 and 1A may be configured to operate when the predetermined conditions are satisfied.

According to Modification Example 1, however, the vehicle-compartment abnormality detection apparatuses 1 and 1A may be configured to stop operating based on an intention of the driver or occupant of the vehicle. Such a configuration allows the driver to complete his/her short-time jobs without waking a sleeping child or to take a rest outside the vehicle without waking a sleeping passenger during night traveling, for example.

Modification Example 2

In the first and second example embodiments, the vehicle-compartment abnormality detection apparatuses 1 and 1A may determine an abnormality, based on the sensor signal of the pressure sensor 300 issued in a real time. According to Modification Example 2, however, a more detailed determination may be made based on a time-series variation in level of the sensor signal of each pressure sensor 300.

For example, in a case where both the group of pressure sensors 300 planarly arranged in the lower region of the seat surface 11 of the passenger's seat 10 and the group of pressure sensors 300 planarly arranged in the upper or lower region of the floor carpet 12 disposed near the feet of the passenger have outputted sensor signals of respective levels and where the levels of the sensor signals of the groups of pressure sensors 300 have exhibited time-series variation tendencies similar to each other, it may be determined that the variation in level has been caused by sway of the vehicle during traveling and that the load disposed on the seat surface 11 of the passenger's seat 10 and the load disposed on the floor carpet 12 are cargos rather than occupants.

Modification Example 3

In the second example embodiment, the determination as to whether a smart key is present inside the vehicle compartment when it is determined that the door of the vehicle is open and that the smart key is not operated. According to Modification Example 3, however, data on digital keys owned by possible drivers of the vehicle is preliminarily stored, and a determination may be made as to whether the door of the vehicle is unlocked by the smart key or a smartphone including the digital key.

In some embodiments, it is possible to implement the vehicle-compartment abnormality detection apparatus 1 or 1A of the example embodiment of the disclosure by recording the process to be executed by the determiner 130 and the abnormality detector 140 in the controller 100 or the determiner 130A and the abnormality detector 140A in the controller 100A on a non-transitory recording medium readable by a computer system, and causing the computer system to load the program recorded on the non-transitory recording medium onto the determiner 130 and the abnormality detector 140 in the controller 100 or the determiner 130A and the abnormality detector 140A in the controller 100A to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some embodiments of the disclosure have been described in detail with reference to the accompanying drawings, all the vehicle-compartment abnormality detection apparatuses implementable through modifications appropriately made by those skilled in the art based on the vehicle-compartment abnormality detection apparatus according to the foregoing example embodiments of the disclosure also fall within the technical scope of the disclosure as long as they include the gist of the disclosure.

Within the scope of the idea of the disclosure, those skilled in the art can conceive of various modifications and alterations, and it is understood that these modifications and alterations also fall within the technical scope of the present invention.

For example, those skilled in the art may add some constituent elements to or delete some constituent elements from the foregoing example embodiments, as appropriate, or add some steps to or remove some steps from the foregoing example embodiment, as appropriate. These embodiments are also included in the technical scope of the disclosure as long as they include the gist of the disclosure.

Further, it will be understood that other effects than those provided by the foregoing example embodiments and apparent from the description herein or appropriately conceivable by those skilled in the art are naturally provided by the disclosure.

Various aspects of the disclosure may be provided by appropriately combining the constituent elements disclosed in the foregoing example embodiments.

For example, some components may be deleted from all the components disclosed in the foregoing example embodiments.

Furthermore, components across different embodiments may be combined as appropriate.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a", "an", and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "disposed on/provided on/formed on" and its variants having the similar meaning thereto as used herein refer to elements disposed directly in contact with each other or indirectly by having intervening structures therebetween.

One or more of the sensor signal processor 110, the comparator 120, the determiner 130, and the abnormality detector 140 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the sensor signal processor 110, the comparator 120, the determiner 130, and the abnormality detector 140 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the sensor signal processor 110, the comparator 120, the determiner 130, and the abnormality detector 140 illustrated in FIG. 1.

The invention claimed is:

1. A vehicle-compartment abnormality detection apparatus configured to be applied to a vehicle, the vehicle-compartment abnormality detection apparatus comprising:

a sensor signal processor configured to receive a sensor signal from a group of pressure sensors disposed inside a vehicle compartment of the vehicle;

a comparator configured to make a comparison of a sensor signal level that is a signal level of the sensor signal received by the sensor signal processor with a predetermined threshold;

a determiner configured to start up when a result of the comparison made by the comparator indicates that the sensor signal level is greater than the predetermined threshold in a state where a drive system of the vehicle is stopped, and make a first determination at least as to whether a key is present inside the vehicle compartment; and an abnormality detector configured to start up when the result of the comparison made by the comparator indicates that the sensor signal level is greater than the predetermined threshold in the state where the drive system of the vehicle is stopped, and detect an abnormality occurring inside the vehicle compartment when a result of the first determination made by the determiner indicates that the key is not present inside the vehicle compartment.

2. The vehicle-compartment abnormality detection apparatus according to claim 1, wherein the predetermined threshold comprises a threshold usable for excluding a weight of a child safety seat or a weight of a junior safety seat when the child safety seat or the junior safety seat is disposed on a seat inside the vehicle, and the predetermined threshold is settable by an occupant of the vehicle.

3. The vehicle-compartment abnormality detection apparatus according to claim 1, wherein the determiner is further configured to make a second determination as to whether a door of the vehicle is locked, and the abnormality detector is configured to detect leaving of a passenger inside the vehicle compartment as the abnormality when a result of the second determination made by the determiner indicates that the door is locked and the result of the first determination made by the determiner indicates that the key is not present inside the vehicle compartment.

4. The vehicle-compartment abnormality detection apparatus according to claim 1, wherein the determiner is further configured to make a second determination as to whether a door of the vehicle is locked, and the abnormality detector is configured to detect a break-in of a third party different from an occupant of the vehicle in the vehicle as the abnormality when a result of the second determination made by the determiner indicates that the door is unlocked and the result of the first determination made by the determiner indicates that the key is not present inside the vehicle compartment.

5. The vehicle-compartment abnormality detection apparatus according to claim 3, further comprising a notifier configured to notify the abnormality to inside and outside the vehicle compartment, wherein the notifier is configured to execute a notification when the abnormality is detected by the abnormality detector.

6. The vehicle-compartment abnormality detection apparatus according to claim 4, further comprising a notifier configured to notify the abnormality to inside and outside the vehicle compartment, wherein the notifier is configured to execute a notification when the abnormality is detected by the abnormality detector.

7. A vehicle-compartment abnormality detection apparatus configured to be applied to a vehicle, the vehicle-compartment abnormality detection apparatus comprising:

a group of pressure sensors disposed inside a vehicle compartment of the vehicle;

one or more processors; and one or more memories communicably coupled to the one or more processors, wherein the one or more processors are configured to receive a sensor signal from the group of pressure sensors, make a comparison of a sensor signal level that is a signal level of the sensor signal with a predetermined threshold, start up a drive system of the vehicle when a result of the comparison indicates that the sensor signal level is greater than the predetermined threshold in a state where the drive system of the vehicle is stopped, and make a determination at least as to whether a key is present inside the vehicle compartment, and detect an abnormality occurring inside the vehicle compartment when a result of the determination indicates that the key is not present inside the vehicle compartment.

* * * * *